United States Patent
Vilhuber (12)

(10) Patent No.: US 6,470,453 B1
(45) Date of Patent: Oct. 22, 2002

(54) VALIDATING CONNECTIONS TO A NETWORK SYSTEM

(75) Inventor: Jan Vilhuber, Felton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/156,209

(22) Filed: Sep. 17, 1998

(51) Int. Cl.[7] .............................................. G06F 11/30
(52) U.S. Cl. ........................ 713/201; 709/225; 709/229
(58) Field of Search ............................... 713/201, 202, 713/200; 709/225, 227, 229

(56) References Cited

U.S. PATENT DOCUMENTS

| | | | | |
|---|---|---|---|---|
| 5,615,277 A | * | 3/1997 | Hoffman | 382/115 |
| 5,657,389 A | * | 8/1997 | Houvener | 380/23 |
| 5,899,983 A | * | 5/1999 | Hussmann | 705/44 |
| 5,908,469 A | * | 6/1999 | Bott et al. | 713/201 |
| 6,023,762 A | * | 2/2000 | Dean et al. | 713/193 |
| 6,040,783 A | * | 3/2000 | Houvener et al. | 340/825.31 |
| 6,052,785 A | * | 4/2000 | Lin et al. | 713/201 |
| 6,067,623 A | * | 5/2000 | Blakley, III et al. | 713/201 |
| 6,134,549 A | * | 10/2000 | Regnier et al. | 707/9 |
| 6,161,182 A | * | 12/2000 | Nadooshan | 713/172 |
| 6,240,455 B1 | * | 5/2001 | Kamasaka et al. | 709/229 |

* cited by examiner

*Primary Examiner*—Norman M. Wright
(74) *Attorney, Agent, or Firm*—Hickman Palermo Truong & Becker LLP

(57) ABSTRACT

A mechanism for authenticating multiple connections to a network server is disclosed. A client establishes a first connection to the server. In establishing the first connection, the client provides authentication information and authorization information, and in response the server assigns first access privileges to the client. When the client requests a second connection, the server receives authentication information from the client, and assigns limited access privileges to the client. The server associates the first connection with the second connection and the client. The server automatically associates the first access privileges with the second connection, without requiring the client to provide authorization information for the second connection.

22 Claims, 6 Drawing Sheets

VALIDATING CONNECTIONS TO A NETWORK SYSTEM

FIELD OF THE INVENTION

The present invention generally relates to management of computer networks, and relates specifically to validating connections to a network system.

BACKGROUND OF THE INVENTION

A network system generally includes a number of network devices, such as switches, routers, and others, connected so as to allow communication among the devices and end station devices such as desktop machines, servers, hosts, printers, fax machines, and others. Many companies have a desire to provide remote access to their computer networks. By allowing remote access, individuals can connect to the computer network to use it to work and obtain resource information while located at a remote site.

A popular method of providing remote access to a network is through the use of a dial-in network access server (NAS) that controls access to the network. For example, the server model AS5300, commercially available from Cisco Systems Inc., can be used to provide dial-in access to a company's network. Individuals can access the network system by dialing into the network access server from a Remote Node to establish a connection. In this document, the term Remote Node refers to a client device such as a personal computer (PC) or router that can be used to dial in and establish a connection with a network access server. A client/server relationship exists between the Remote Node (client) and the network access server (server).

A drawback associated with providing remote access to a company's network system is that unauthorized individuals can sometimes gain access to the network system, thus potentially allowing the company's resources and information to be accessed, used or compromised. To prevent unauthorized network access, several protocols have been developed that can be used to identify remote nodes that are authorized to remotely connect and access the network system before a connection is actually established.

In general, dial-in connections are typically made using one of the Internet's standard dial-in protocols, either the Point-to-Point Protocol (PPP) or the Serial Line Internet Protocol (SLIP). To prevent unauthorized network access, a "client authentication" phase is typically performed before a remote node is allowed to connect to a network access server. During the client authentication phase, the particular client that is requesting a dial-in connection be established is identified.

The PPP supports an optional authentication phase by providing two authentication protocols, the Password Authentication Protocol (PAP) and the Challenge Handshake Authentication Protocol (CHAP). Both PAP and CHAP use a set of fixed passwords to authenticate a remote node that is requesting to make a dial-in connection with a network access server. To authenticate the remote node, both PAP and CHAP require the remote node to provide "client access" information that can be used to determine whether the remote node is allowed to remotely connect to the network access server.

For example, if CHAP is used to establish the connection, a "challenge" message is sent by the network access server to the remote node. Upon receiving the challenge message, the remote node calculates a value based on the challenge message using a "one-way" hash function. The remote node then returns the calculated value back to the network access server. Upon receiving the calculated value, the network access server compares the value to its own calculation of the expected hash value. If the values match, the remote node is identified and the network access server establishes a connection with the remote node. A benefit with using CHAP is that it protects against unauthorized attacks as the challenge message value is varied from one authentication phase to the next.

Alternatively, using PAP a user is required to supply client access information in the form of a username and password that is used by the network access server to identify the remote node. If the user is using a "hands on" remote device having a display and input device, such as a PC, the network access server may cause a login window to be displayed on the monitor of the PC. The user is then required to enter a valid username and password in order to establish a connection between the network access server and the remote node. Based on the supplied username and password, the network access server can identify the remote node to determine whether a connection should be established between the network access server and the remote node.

Following the client authentication phase, a "client authorization" phase is performed to determine the functions and operations that may be performed by the remote node during the lifetime of the connection. The client authorization phase is performed by the NAS on behalf of the remote node. To perform the client authorization phase, the NAS determines a set of access privileges based on the identity of the remote node. These access privileges are then assigned to the established connection and control the set of functions and operations that may be performed by the remote node.

One drawback with using dial-in protocols such as PPP or SLIP to establish a dial-in connection is that all connections that are established between a particular remote node and a network access server are provided with the same set of access privileges. For example, when user A connects to a first network access server using remote node X, they are provided the same set of access privileges that are provided to user B when they connect to the first network access server using remote node X. Thus, access privileges cannot be provided on a per user basis.

Another drawback with using dial-in protocols such as PPP or SLIP to establish a dial-in connection is that they require fixed passwords and therefore can not take advantage of the extra security that is provided through the use of a Smart card or Token card. One type of Token card, the SecurID card commercially available from Security Dynamics, Inc., continually generates a series of random one-time passwords that can be used once to login into a network access server. The Token card works in conjunction with a password server, such as Security Dynamics' ACE password server and generates a response that is unique for every login. The result is a one-time password that, if monitored, cannot be reused by an intruder to gain access to an account. To use the Token card, the user typically enters a series of digits and letters displayed on the token-card in the prompt window or inserts the card into a reader that is coupled to the Remote Node. The password server internally generates one-time passwords in synch with the card. The one-time password is then used to verify that the user is allowed to log into the network access server through the remote device to access the network system by comparing the card password to the password server's password at a particular instant in time.

In certain cases, Token cards can provide a greater level of security, as the password is only valid for a single session.

For example, sometimes a user selects the "save password" button on the client so that the user does not have to enter the client access information every time they dial in to the network access server. However, if the individual's client computer is stolen, an unauthorized user may potentially dial in and connect to the network access server, thus compromising the information and resources that are accessible through the network access server. Conversely, if a Token card could be used to provide the client access information, even if an individual's computer is stolen, an unauthorized user will not be able to log into the network access server and gain access to the network system without also obtaining the Token card.

In addition, many home office users have begun using access router devices, such as router models 1004 and 1604, commercially available from Cisco Systems Inc., to remotely connect to a company's network access server. Access routers are "hands-off" devices that have no display device and therefore cannot display a login window for the user to enter user access information. Instead, the user is required to provide the user access information through an alternative means such as a Token card. Passwords are statically configured or stored in the router.

Based on the foregoing, there is a clear need for a mechanism that provides users with an individual set of access privileges for controlling their access to a network system.

There is also a clear need for a mechanism that does not compromise the security of the network system, yet allows additional connections to be established for a particular user without requiring the user to enter additional access information.

There is also a need for a mechanism that provides for the use of Token cards with hands-off devices, such as routers and other devices.

There is also a clear need for a mechanism that can provide an enhanced password security system that can reduce unauthorized access of a company's network.

There is an additional need for a mechanism having these characteristics and also providing two levels of security.

SUMMARY OF THE INVENTION

The foregoing needs, and other needs and objects that will become apparent from the following description, are achieved in the present invention, which comprises, in one aspect, a method for establishing connections between a client and a server, the method comprising the steps of receiving a request to establish a connection between the client and the server; performing client authentication by determining whether the client is allowed to connect to the server; performing client authorization by assigning a set of client access privileges to the connection; performing user authentication by determining whether the user is allowed to access the server; and performing user authorization by assigning a set of user access privileges to the connection.

One feature of this aspect is that the step of performing user authentication comprises the steps of receiving user access information, wherein the user access information is associated with a particular user; and determining whether the user is allowed to access the server based on the user access information that is received. Another feature is that the step of performing user authorization comprises the step of determining the set of user access privileges based on the user access information; and replacing the set of client access privileges assigned to the connection with the set of user access privileges.

Yet another feature is that the step of receiving the request to establish the connection comprises the step of receiving a dial-in request at the server from the client. Still another feature is that the step of performing client authentication phase comprises the steps of receiving client access information that is associated with the client; and determining whether the user is allowed to access the server based on the client access information that is received.

According to another feature, the step of performing client authorization comprises the step of identifying a set of minimal access rights, wherein the set of minimal access rights severely restricts functions that can be performed through the connection; and assigning the set of minimal access rights to the connection. In still another feature, the step of performing client authentication comprises the steps of authenticating the client using the Challenge Handshake Authentication Protocol (CHAP). A related feature is that the step of performing client authentication phase comprises the step of authenticating the client using the Password Authentication Protocol (PAP). Another related feature is that the step of performing client authentication comprises the step of establishing a first connection between the client and the network access server when the client is allowed to connect to the server.

Still another feature is that the step of receiving user access information comprises the step of receiving user access information that is supplied from a Token card. A related feature is that the step of receiving user access information comprises the steps of displaying a login window on the client; and receiving user access information in the login window.

According to another feature, the step of establishing the first connection comprises the step of establishing a first Point-to-Point (PPP) connection between the client and the network access server. A related feature is that the step of establishing the first connection comprises the step of establishing a first Serial Line Internet Protocol (SLIP) connection between the client and the network access server.

In yet another feature, the method further involves the steps of receiving a second request to establish a second connection between the client and the server; performing a second client authentication by determining whether the client is allowed to connect to the server; determining whether a first connection is active between the client and the server; and assigning the set of user access privileges to the second connection, wherein the set of user access privileges are assigned to the second connection without performing the second client authentication. A related feature is that the step of performing the second client authentication comprises the step of establishing the second connection between the client and the network access server when the client is allowed to connect to the server.

In another related feature, the step of establishing the second connection comprises the step of establishing a second Point-to-Point (PPP) connection between the client and the network access server. In still another related feature, the step of establishing the second connection comprises the step of establishing a second Serial Line Internet Protocol (SLIP) connection between the client and the network access server.

According to yet a further feature, the step of establishing the second connection comprises the steps of generating a bundle header at the network access server; attaching the first connection and the second connection to the bundle header.

The invention also encompasses a computer-readable medium, a computer data signal embodied in a carrier wave, and an apparatus configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
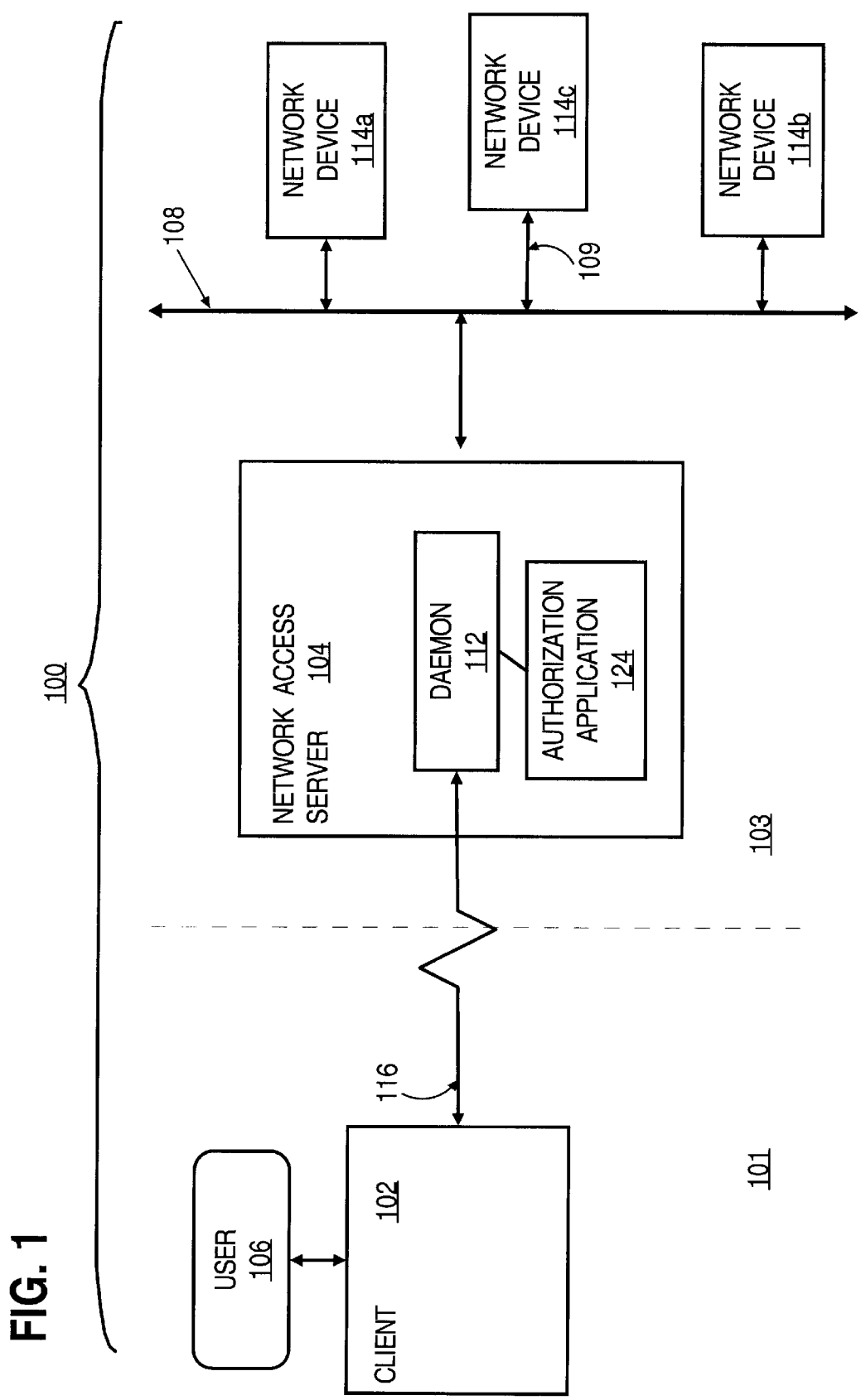
FIG. 1 is a block diagram of a computer system architecture in which the present invention may be utilized.

A method and apparatus for validating access to a network system is disclosed. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

In one embodiment, a client, acting as a "peer," sends a message to a server, acting as an "authenticator", requesting that a connection be established. Upon receiving the request from the client, the server communicates with the client to configure and establish a connection between the client and the server. In certain embodiments, a point-to-point connection is established between the client and the server.

To establish the connection, a client authentication phase is performed by the server to determine whether the client is allowed to maintain a connection with the server. If the client is allowed to maintain a connection with the server ("Authenticated"), the server performs a client authorization phase to identify a set of client access privileges ("client privileges") based on certain attributes of the client. The client privileges provide a limited set of access rights to the user that is attempting to access the network system over the connection that was established between the client and the server.

Once the connection between the client and the server is Authenticated and Authorized, a user authentication phase is initiated to determine whether the particular user is allowed to access the server. During the user authentication phase, the user is required to supply "user" access information. The user access information is used to determine whether the user is allowed to access the server. The server then performs a user authorization phase, which determines a set of user access privileges ("user privileges") based on the supplied user access information. The user privileges are then assigned to the connection and are used to determine which network devices and network resources are accessible by the particular user. Thus, the user privileges take precedence over, and therefore override the client privileges. In this context, the act of overriding the client privileges is referred to as "the connection inheriting the user privileges".

In certain embodiments, when a client requests a server to establish a session, the server determines whether a connection already exists between the client and the server. If the server determines that a connection already exists, an additional connection is established by performing only the client authentication phase to authenticate the client. Thus, instead of performing the client authorization phase to determine the client privileges, the user privileges that were previously assigned to the prior connection are automatically inherited by the additional connection. Thus, only the client authentication phase is repeated to establish additional connections between the client and the network access server.

FIG. 1 is a block diagram of a system 100 in which the invention can be used. Generally, the system 100 includes a client 102, a network access server 104, and a network 108. Client 102 and network access server 104 are respectfully located in logically distinct regions 101 and 103, which may be geographically separate.

The client 102 is a device, such as a PC or router, that is capable of dialing into the network access server 104 to establish a connection 116. In one embodiment, client 102 is itself a network access server that used to establish one or more connections to the network access server 104. Client 102 is used by or associated with a user 106. Although one client 102 is shown in FIG. 1 by way of example, any number of clients can be included in the system 100, and multiple connections 116 can be used to connect the clients to the network access server 104.

The network 108 is a network system comprising any number of network devices 114a, 114b, 114c interconnected by one or more communications channels 109. Ethernet, Token Ring, or other protocols can characterize the communications channels 109. Communication channels 109 may form part of a LAN or WAN.

The network access server 104 is a computer, or a group of hardware or software components or processes that cooperate or execute in one or more computer systems. The network access server 104 is coupled to the network 108 and controls remote access to the network 108 and the network devices 114a–c.

In certain embodiments, a firewall (not shown), such as the Cisco PIX Firewall, which is commercially available from Cisco Systems, Inc. may be logically interposed between the network access server 104 and network 108. The firewall may be used to control access and log-in access attempts to network 108 based on identification information that is associated with the outside communication, by intercepting all communications moving to and from the network access server 104 and determining whether to admit or block the communications. The firewall can be used to prevent unauthorized clients from connecting to network 108 and other devices that are logically behind the firewall.

The network access server 104 has a daemon 112 that can respond to a dial-in request from the client 102 to establish a connection 116 between the server 102 and the client 104. As used in this document, "daemon" generally means a program that services network requests for client authentication and authorization, verifies identities, grants or denies authorizations, and logs accounting records.

In certain embodiments, daemon 112 runs on a computer that is separate from network access server 104 and communicates with the network access server 104 over an internal network. For example, the daemon 112 can be a tacacs+ server or a Radius server that functions as a separate entity from the network access server 104.

In a preferred embodiment, the connection 116 is established as a Point to Point Protocol (PPP) connection. However, PPP is merely an example of a communications protocol that can be used in an embodiment. Other protocols, such as the Serial Line Internet Protocol (SLIP), that facilitate the exchange of information between a client and server can be used. PPP is described in "Understanding PPP and PPP Authentication," accessible at http://www-fr.cisco.com/warp/public/779/smbiz/service/knowledge/wan/ppp_auth.htm. PPP is defined in W. Simpson, "The Point-to-Point Protocol," RFC 1548, December 1993. PPP MP is described in K. Sklower et al., "The PPP Multilink Protocol (MP)," RFC 1990, August 1996.

The server 104 also runs application programs, such as an Authorization application 124. The Authentication application 114 is a back-end, server-side mechanism that is used to determine whether a particular user is authorized to access the network 108 through network access server 104.

Figure 2:
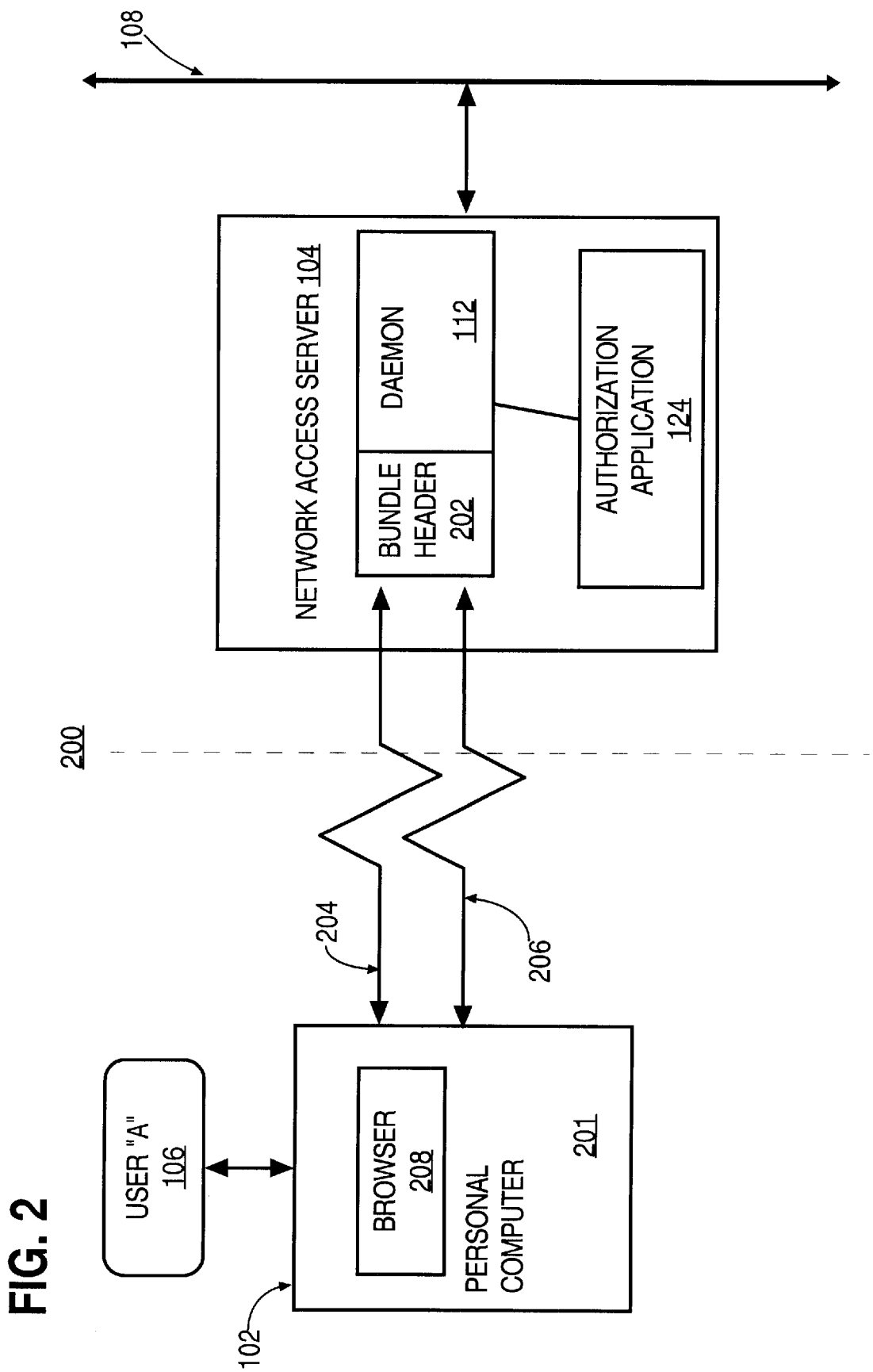
FIG. 2 is a block diagram of the system of FIG. 1 showing certain internal details.

FIG. 2 is a block diagram of the system of FIG. 1 showing certain internal details. In this example, the client is a personal computer 201 having a plurality of modems that can be used by user "A" 106 to establish a plurality of dial-in connections. The network access server 104 has a daemon 112 that can respond to requests from the client 102 to establish one or more connections 204 and 206 between the network access server 104 and the client 102. In certain embodiments, personal computer 201 is configured with or coupled to, multiple modems or ISDN bearer channels that can be used to establish the one or more connections 204 and 206. In one embodiment, the personal computer 201 runs a browser application program, such as Netscape Navigator® or Microsoft Internet Explorer®. User 106 can use browser 208 to cause a connection to be established with network access server 104. Personal computer 201 may also run a dial-up networking application program or other software components cause a dial-in connection to be established.

Establishing an Initial Connection

Upon receiving a dial-in request from client 102, the daemon 112 performs a client authentication phase, to authenticate client 102 as being allowed to connect with network access server 104. In the preferred embodiment, the authentication phase involves the exchange by client 102 and network access server 104 of one or more messages having a form and content defined by CHAP. CHAP is described in W. Simpson, "PPP Challenge Handshake Authentication Protocol," RFC 1994, August. 1996. In one embodiment, connections 204 and 206 are established as PPP Multilink Protocol (MP) connections that are attached at a bundle header 202 in network access server 104. However, PPP MP is merely an example of a communications protocol that can be used for connections 204 and 206. Thus, other communication protocols that provide the necessary communication interface can be used.

To establish a first connection 204 between the client 102 and the network access server 104, the daemon 112 performs a client authorization phase to determine whether personal computer 102 is allowed to connect to the network access server 104. If the client 102 is identified as being allowed to connect to the network access server 102, the first connection 204 is established and a subsequent client authorization phase is performed to establish the client privileges for personal computer 102. During the client authorization, a set of client access privileges is associated with the first connection 204.

Once the client authentication and client authorization phases complete, a "user authentication" phase is performed to verify that the particular user is allowed to access the network system.

During the user authentication phase user A is required to provide "user access" information, typically in the form of a username and password. The user access information is used by authorization application 124 to verify that the user A is allowed to access the network system 108 using the network access server 104. If the user A is using a "hands on" remote device having a display and input device, such as a PC 201, the network access server 104 may cause a login window to be displayed on the monitor of the PC 201. The user A is then required to enter a valid username and password in order to log into the network access server to gain access to the network system.

After the user authentication phase completes, a "user authorization" phase is performed, this time on behalf of the user A, to determine the new access rights for the first connection 204. These new access rights override the access rights that were previously established during the client authorization phase.

In one embodiment, to begin the client authentication phase, the user A telnets to the network access server 104 using the first connection 204. The user A then provides a valid username and password to establish the telnet connection. The valid username and password may be provided to the network access server 104 using a variety of techniques. For example, a static user name password that is associated with the particular user may be used to establish the telnet connection. Alternatively, user access information that is obtained through the use of a Smart card or Token card may be provided to the network access server 104.

Once the telnet connection is established, the authorization application 124 runs an access profile command that causes the first connection 204 to inherit the set of user access privileges. Thus, the set of client access privileges that were initially associated with the first connection 204 are replaced with the new set of user access privileges. This provides for a different set of user access privileges to be established for each user who establishes a connection with network access server 104.

Establishing Addition Connections

A drawback with using dial-in protocols such as PPP or SLIP is that additional connections that are made by a client that is currently connected to the network access server are treated as separate connections during the client authentication and authorization phases. Thus, to establish a second connection between the remote node and the network access server, the user is required to reenter valid user access information a second time.

For example, consider the situation of a small office or home office user who uses a client that communicates with a network using an integrated services digital network (ISDN) line having first and second bearer (data) channels. Normally the client connects to a network, ISP, or server using only the first data channel and using the access procedure described above. If an additional connection is made, for example, by activating the second ISDN channel to accommodate a large data transfer, the user is required to enter valid client access information to establish the second connection. Requiring client access information to be entered whenever an additional connection is made can be both irritating and burdensome on the user. In addition, if the user is using a Token card with a "one-time" password, the user must again use the Token card to provide another valid one-time password for the additional connection. PPP users having multiple connections (for example, PPP Multilink connections) experience the same inconvenience.

One method of allowing users to establish multiple connections using a Token card is through a mechanism known as "Token caching". To perform Token caching, the network access server saves the one-time password in memory for a certain period of time. Whenever a new connection is established, the network access server uses the stored "one-time" password again as the client access information to authorize the connection. Although Token caching can allow additional connections to be established by users using a Token card, the use of Token caching compromises the security of the network system, because additional connections are established using the same one-time password. Because the same on-time password can be used to establish additional connections, the network system is open for attacks by unauthorized users. For example, by allowing the one-time password to be used multiple times for establishing additional connections, if the one-time password is "sniffed" by an unauthorized user while it is still saved in memory, it can be used by to connect to the network access server and thereby gain unauthorized access to the network system.

Therefore, to establish additional connections, such as additional connection 206, neither the client authorization phase, the user authentication phase nor the user authorization phase is performed. Instead, the authorization application 124 identifies connection 206 as being from a client, namely personal computer 201, that already has an active first connection 204, and therefore automatically assigns to the additional connection 206 the same privileges that were assigned for connection 204. Thus, to establish additional connection 206, the user "A" 106 is not required to enter valid user access information a second time.

Although one client 102 is shown in FIG. 2 by way of example, any number of clients can be included in the system 200, and multiple connections 204 and 206 can be used to connect the clients to the network access server 104.

Establishing Connections

Figure 3A:
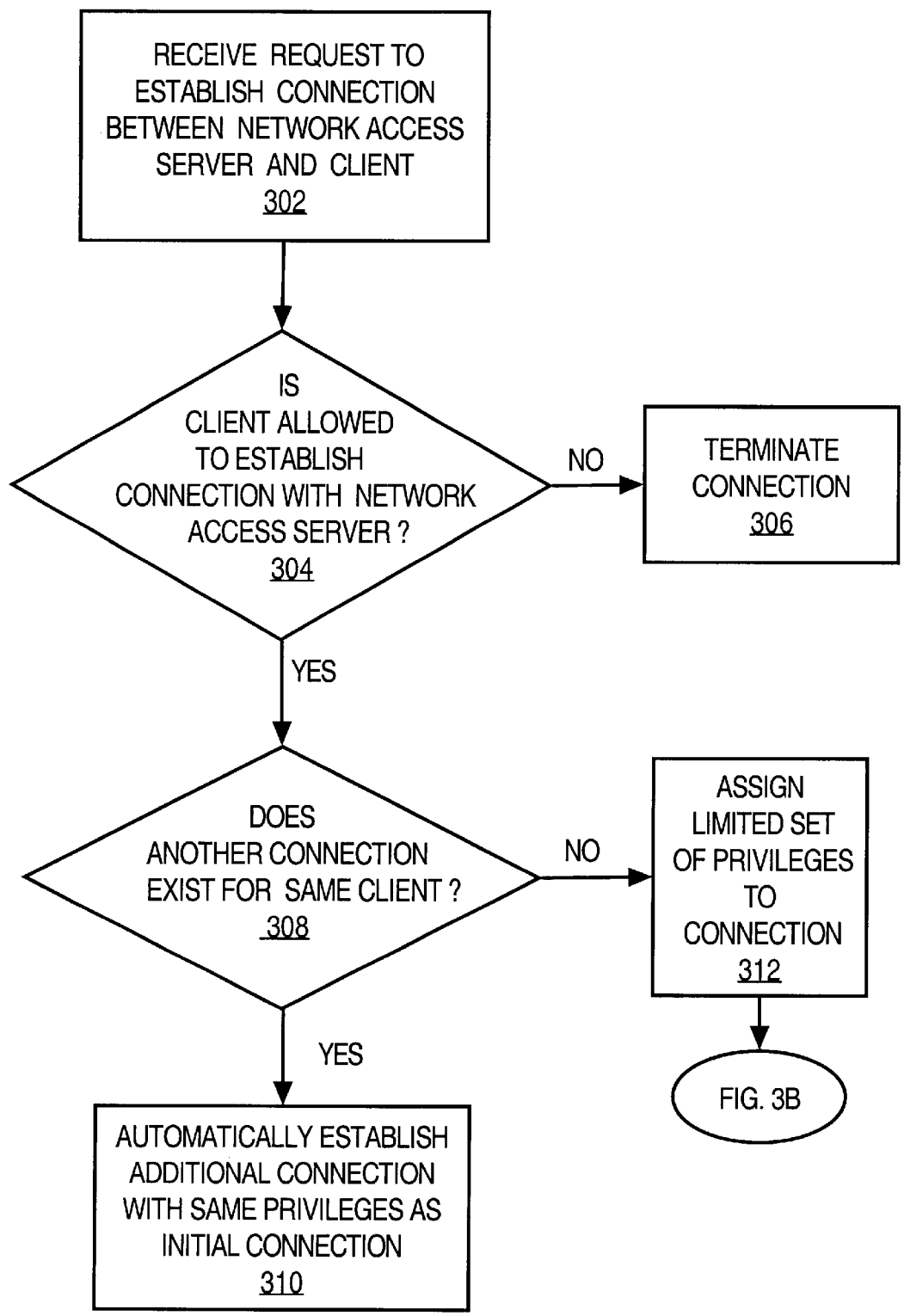
FIG. 3A is a flow diagram that illustrates steps involved in a method of validating a plurality of connections to a network access server.
Figure 3B:
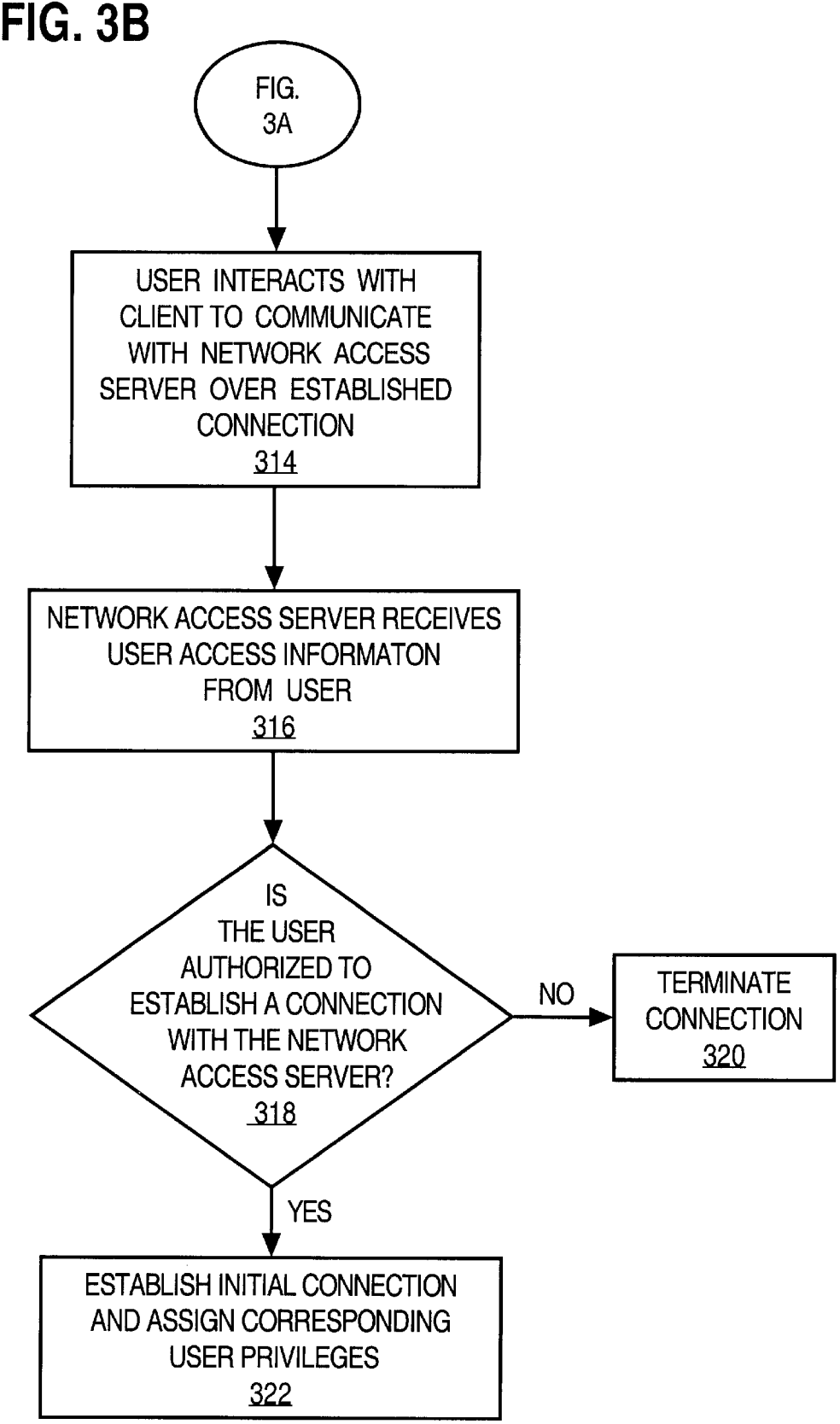
FIG. 3B is a flow diagram that illustrates further steps in the method of FIG. 3A.

FIG. 3A and FIG. 3B are flow diagrams that illustrate a method of validating one or more connections in the foregoing context. The steps of FIG. 3A and FIG. 3B will be explained with reference to the components of FIG. 2. For explanation purposes, connection 204 is the first or initial connection made and connection 206 is the second or additional connection made. Of course, the converse is also appropriate.

At block 302, a network access server receives a request to establish a connection with a client. The request may be received as the result of a user operating a client to dial into a network access server to request a connection to be established. For example, in one embodiment, user 106 executes browser 208 on client 102 to dial into network access server 104 to request a PPP Multilink connection.

As shown by block 304, upon receiving the dial-in request, the network access server performs a client authentication phase. As part of the client authentication phase, the network access server uses client access information to determine whether the client is allowed to establish a connection with the network access server. In one embodiment, the client authentication phase is performed using CHAP.

For example, upon receiving a dial-in request from the client 102 as peer, the daemon 112 in network access server 104 as authenticator sends a "challenge" message to the client 102. The client 102 then responds to the challenge with a value that is calculated using a one-way hash function. Daemon 112 computes an expected hash value. Upon receiving the value from the client 102, the daemon 112 compares the value against the expected hash value to determine whether the connection should be established.

CHAP is used only as an example of an authentication protocol that can be used in performing the authentication phase. Other alternative embodiments may include performing the authentication phase using an authentication protocol such as PAP.

If the test of block 304 determines that the client is not authorized to establish a connection with the network access server, then as shown by block 306, the connection is refused or terminated.

However, if the test of block 304 determines that the client is allowed to establish a link with the network access server, then as shown by block 308, the network access server determines whether a connection is currently active between the client and the network access server. For example, for MP connections, an active connection is identified by an "endpoint-discriminator". In one embodiment, the endpoint-discriminator is the name of the remote node. An additional connection that is made by the same client will contain the same endpoint-discriminator and therefore can be used to determine whether a connection is currently active between the network access server and the client. The use of endpoint-discriminators for determining existing connection is discussed in the Multilink Protocol RFC cited above, RFC 1990.

If at block 308 it is determined that a connection is currently active between the client and the network access server, then as shown in block 310, the network access server automatically establishes the additional connection without requiring additional authentication and authorization phases to be performed. Instead, the additional connection inherits the set of user access privileges that were assigned to the previous connection. Thus, the user is not required to reenter valid user access information to establish the additional connection. In an exemplary embodiment, additional connections are established as MP connections and are attached to a data structure called a bundle header that causes the multiple connections to appear as a single connection, but having benefit of a throughput rate from multiple connections.

Alternatively, if the test of block 308 determines that an active connection does not exist between the client and the network access server, then as shown by block 312, a client authorization phase is performed to assign a set client privileges to the connection. In one embodiment, the set of client access privileges enable the user to telnet into the network access server, but restricts other protocols or interfaces. For example, in establishing the connection 204, the daemon assigns a limited set of privileges to the connection 204, which severely restrict what functions can be performed through the connection. Generally, it is preferable to configure the client privileges so as to provide minimal network access. For example, the use of all protocols, including Internet Protocol (IP), except when used to connect to the network access server, should be prohibited via appropriate access lists on the network access server.

Referring now to FIG. 3B, as shown by block 314 the user interacts with the client in order to communicate with the network access server over the established connection. In one embodiment, the user uses the client to telnet to an authorization application. For example, to establish connection 204, client 102 telnets to the authorization application 124 over connection 204.

As shown by block 316, a user authentication phase is performed to determine whether the user is authorized to connect to the network access server. To perform the user authentication phase, the user is required to provide user access information that is used by the authorization application to determine if the user should be allowed to connect to the network access server. In one embodiment, the user access information is provided through the use of a Token card. For example, after telnetting to the authorization application 124, the user 106 enters a one-time-password (token) displayed on the Token card in a login window that is displayed on the client 102 by the authorization application 124. In an alternative embodiment, the user inserts the token card in token card reader that is connected to client 102. The client 102 then automatically reads and sends a one-time-password contained on the token card to the authorization application 124. In yet another embodiment, the user 106 enters static user access information (for example, a pre-assigned username and password), in response to a login window displayed on the client 102.

As shown by block 318, upon receiving the user access information, the authorization application determines whether the user is authorized to connect to the network access server.

If the test of block 318 determines that the user is not authorized to connect to the network access server, then as shown by block 320, the authorization application notifies the daemon and the connection between the client and the network access server is terminated.

Conversely, if at block 318 the authorization application determines that the user is authorized to connect to the network access server, then as shown by block 322, a set of user access privileges are determined based on the user access information that was supplied during the user authentication phase. An initial connection is then established between the client and the network access server having the user access privileges. In an exemplary embodiment, the initial connection is established as a MP connection.

In certain embodiments, to establish the initial connection with the correct privileges, the network access server simulates the termination of the connection and the restarting of a new connection. When the new connection is restarted, the restarted connection is assigned access privileges based on the user access information that was retrieved from the daemon on behalf of the user (user privileges). For example, to establish connection 204, the network access server 104 first terminates and then restarts connection 204 with access privileges based on the user privileges that were received from the daemon by the authorization application 124.

In the preferred embodiment, the user's network authorization profile is configured to include an autocommand that runs an "access-profile" command. The access-profile command carries out the steps of block 322. The access-profile command removes the restrictions imposed during the initial PPP authorization, and installs new or different privileges that are associated with the user. The access-profile command causes all PPP network control protocols to be re-authorized with the user's username instead of the CHAP username of the router or dial-in client. As a result, the user's privileges are used instead of the router's network profile (client privileges). This allows two different profiles to be used at two different times in the negotiation process.

Additional PPP multilink channels established for the user continue to use the static CHAP password configured in the router, but are then attached to the bundle header 202 and thereby become part of the multilink bundle. Since the bundle has been authenticated, the additional channels logically or conceptually inherit the security characteristics of the first connection.

It will be apparent that the authorization, authentication, and accounting (AAA) portion of the network operating system used on the network devices of network 108 must be configured to carry out network authentication and authorization. In the preferred embodiment, the network devices of network 108 runs the Cisco Internetworking Operating System (IOS), and its AAA is configured for network authentication and authorization using the commands aaa new-model
aaa authentication ppp default radius
aaa authorization network radius and then the access-profile command is executed. In another embodiment, the command "aaa authorization network radius" is replace with the command "aaa authorization network tacacs+".

In one embodiment, the access-profile command has optional parameters "merge" and "replace". Executing the command "access-profile merge" causes the IOS to remove old access lists, per user and per interface, from the interface, and install a completely new profile. Executing the command "access-profile replace" removes all per-user configurations for the current interface, and installs a completely new profile.

In the preferred embodiment, the operating system executed by the network devices in network 108 has a software unit providing downloadable per-user attribute extensions. An example of an operating system having such extensions is IOS Release 11.3(1) commercially available from Cisco Systems, Inc.

In certain embodiments, the authentication phase is periodically performed on connections that have been established between a client and the network access server.

Other Configurations

Figure 4:
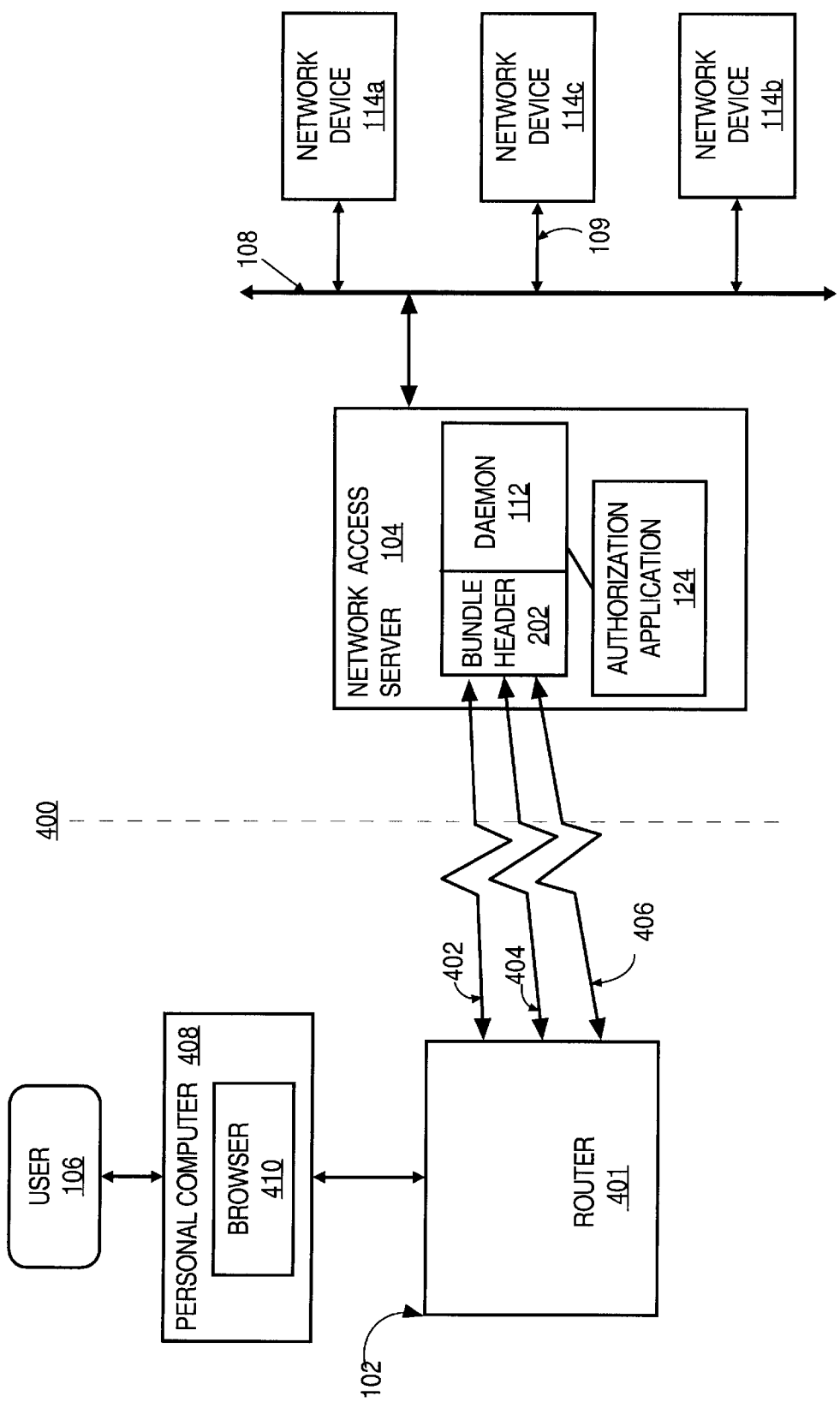
FIG. 4 illustrates is a block diagram of an alternative system in which an embodiment of the invention may be utilized.

In addition to the embodiment depicted in FIG. 2, alternative configurations may be used for authenticating a plurality of connections as described in the foregoing context. FIG. 4 is a block diagram of an exemplary alternative configuration. Client 102 is a router 401, such as a Cisco router model 1004 or 1604, coupled to the network access server 104. In another embodiment, client 102 is itself a network access server, such as Cisco server model AS5300, coupled to network access server 104. Client 102 is coupled to a personal computer 408. By interacting with the personal computer 408 through browser 410, a user 106 can authenticate a plurality of connections 402, 404 and 406 in the manner described above in FIG. 3A and FIG. 3B.

For example, at block 302, the user operates a personal computer to cause the client to dial into a network access server to request a connection to be established. For example, in one embodiment, user 106 executes browser 410 on personal computer 408 to cause router 401 to dial into network access server 104 to request a PPP Multilink connection.

Similarly, if the test of block 308 determines that a connection is not currently active between the network access server and the client, then at block 314 the user interacts with the personal computer to cause the client to communicate with the network access server over the established connection. In one embodiment, the user uses the personal computer to interface with the client to telnet to an authorization application on the network access server. For example, to establish connection 402, the user 106 operates personal computer 408 to telnet to the authorization application 124 over connection 402 through client 102.

Likewise, at block 316, the authorization application receives user access information from the user. In one embodiment, the user access information is provided to the authorization application through the use of a Token card. For example, after telnetting to the authorization application 124, the user 106 enters a one-time password from a Token card. The information on the Token card is read by the client 102 and then sent from the client 102 to the authorization application 124 over connection 402. In an alternative embodiment, the user access information is entered by the user 106 in response to a login window that is displayed on the personal computer 408 by the authorization application 124. Once the user access information is entered by the user 106, it is sent to the client 102 and then forwarded from the client 102 to the authorization application 124 over connection 402.

In still another configuration, in the system 200 or system 400, a single software component executes on network access server 104. The single software component comprises the functions of the daemon 112 and authentication application 124 in integrated form.

In another configuration, in system 200 or system 400, the network connection functions carried out by browser 208 or browser 410 are handled by a telecommunications program rather than a browser.

Hardware Overview

Figure 5:
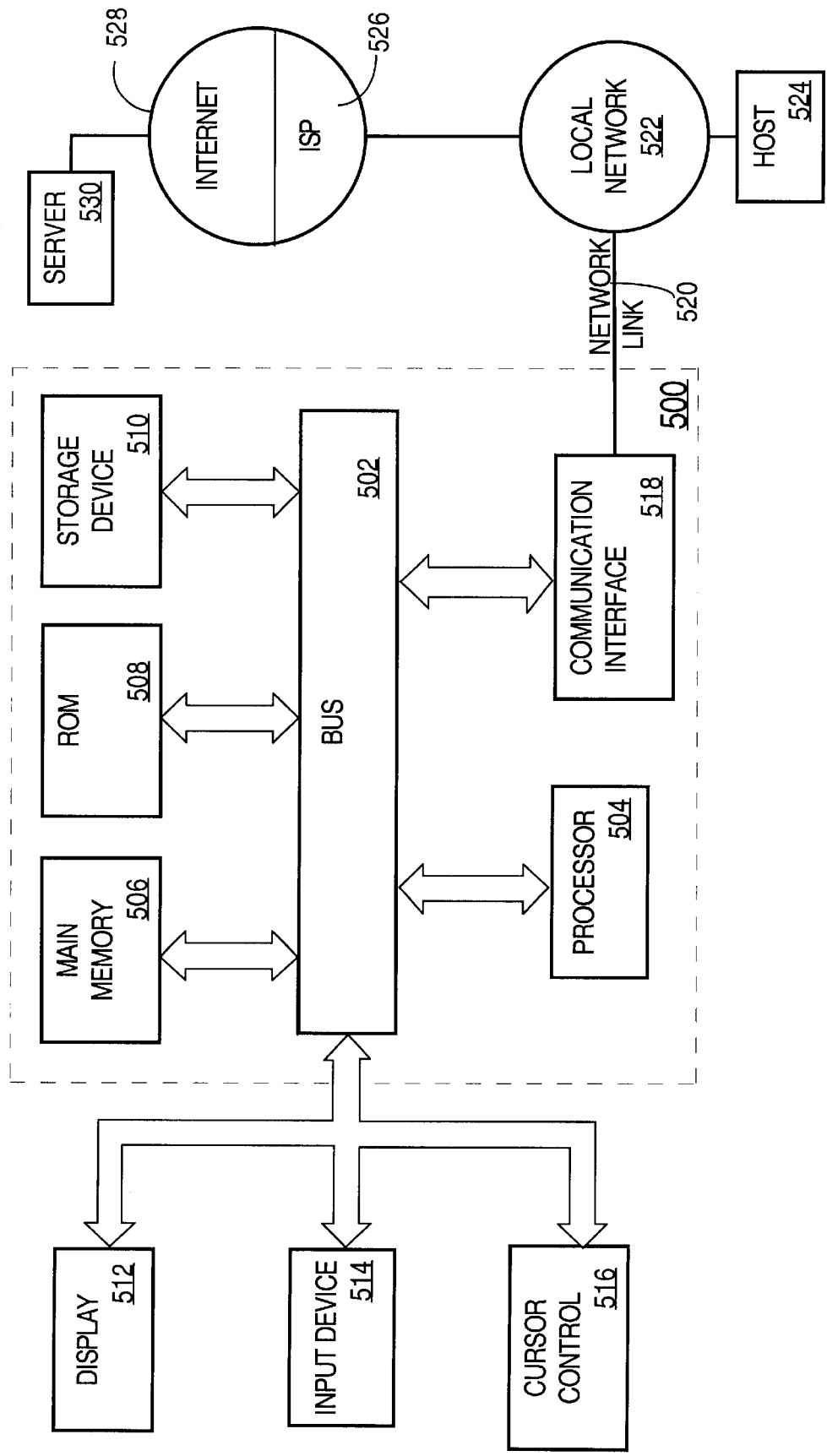
FIG. 5 is a block diagram of a computer system hardware arrangement that can be used to implement aspects of the invention.

FIG. 5 is a block diagram that illustrates a computer system 500 upon which an embodiment of the invention may be implemented. The preferred embodiment is implemented using one or more computer programs running on a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

An input interface 514 may be coupled to bus 502 for communicating information and command selections to processor 504. Input interface 514 is a conventional serial interface such as an RS-232 or RS-422 interface. An external terminal or computer system connects to the router or computer system 500 and provides commands to it using the input interface 514. Firmware or software running in the computer system 500 provides a terminal interface or character-based command interface so that external commands can be given to the computer system.

The invention is related to the use of computer system 500 for validating connections to a network system. According to one embodiment of the invention, the validating of connections to a network system is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for validating connections to a network system as described herein.

The received code may be executed by processor 504 as it is received, and/or stored in storage device 510, or other non-volatile storage for later execution. In this manner, computer system 500 may obtain application code in the form of a carrier wave.

In this configuration, the systems and methods of embodiments of the invention offer distinct advantages over past approaches. For example, authentication of a second channel occurs automatically; the user is not required to enter authentication information or authorization information a second time at the keyboard of the client. Also, token cards can be used in conjunction with hands-off devices, such as routers and other devices. Further, password security is improved. If a user saves a password and the password is compromised, the second authentication step of the invention renders the password useless.

Thus, in an exemplary embodiment, the initial link is established using CHAP. The user opens the link to traffic by authenticating with a Token card, which is highly secure. Additional links are added to the multilink bundle in a manner that is transparent to the user.

The static CHAP password resides in the router and need not be changed to accommodate one-time passwords. The user provides additional security by telnetting to the network access server and providing the one-time password.

Finally, even if the client computer or router is stolen, or the user's password is otherwise compromised, security is enhanced because the one-time password from the token card is initially required.

The invention is not limited to the context shown in drawing figures, and the spirit and scope of the invention include other contexts and applications in which the upgrade and diagnostic functions described herein are available to other mechanisms, methods, programs, and processes. For example, although personal computers have been used for illustrative purposes, other devices, such as workstations or Lap-top computers may be configured to perform the same functions. Thus, the specification and drawings are, accordingly, to be regarded in an illustrative rather than a restrictive sense.

What is claimed is:

1. A method for establishing connections between a client and a server, the method comprising the steps of:

receiving a request to establish a connection between the client and the server;

performing client authentication by determining whether the client is allowed to connect to the server;

performing client authorization by assigning a set of client access privileges to the connection;

performing user authentication by determining whether the user is allowed to access the server; and performing user authorization by assigning a set of user access privileges to the connection.

2. The method as recited in claim 1, wherein the step of performing user authentication comprises the steps of:

receiving user access information, wherein the user access information is associated with a particular user; and determining whether the user is allowed to access the server based on the user access information that is received.

3. The method as recited in claim 2, wherein the step of performing user authorization comprises the steps of:

determining the set of user access privileges based on the user access information; and replacing the set of client access privileges assigned to the connection with the set of user access privileges.

4. The method as recited in claim 1, wherein the step of receiving the request to establish the connection comprises the step of receiving a dial-in request at the server from the client.

5. The method as recited in claim 1, wherein the step of performing client authentication phase comprises the steps of:

receiving client access information that is associated with the client; and determining whether the user is allowed to access the server based on the client access information that is received.

6. The method as recited in claim 5, wherein the step of performing client authorization comprises the steps of:

identifying a set of minimal access rights, wherein the set of minimal access rights severely restricts functions that can be performed through the connection; and assigning the set of minimal access rights to the connection.

7. The method as recited in claim 1, wherein the step of performing client authentication comprises the steps of authenticating the client using the Challenge Handshake Authentication Protocol (CHAP).

8. The method as recited in claim 1, wherein the step of performing client authentication phase comprises the step of authenticating the client using the Password Authentication Protocol (PAP).

9. The method as recited in claim 1, wherein the step of performing client authentication comprises the step of establishing a first connection between the client and the network access server when the client is allowed to connect to the server.

10. The method as recited in claim 2, wherein the step of receiving user access information comprises the step of receiving user access information that is supplied from a Token card.

11. The method as recited in claim 2, wherein the step of receiving user access information comprises the steps of:

displaying a login window on the client; and receiving user access information in the login window.

12. The method as recited in claim 9, wherein the step of establishing the first connection comprises the step of establishing a first Point-to-Point (PPP) connection between the client and the network access server.

13. The method recited in claim 9, wherein the step of establishing the first connection comprises the step of establishing a first Serial Line Internet Protocol (SLIP) connection between the client and the network access server.

14. The method recited in claim 1, further comprising the steps of:
- receiving a second request to establish a second connection between the client and the server;
- performing a second client authentication by determining whether the client is allowed to connect to the server;
- determining whether a first connection is active between the client and the server; and
- assigning the set of user access privileges to the second connection, wherein the set of user access privileges are assigned to the second connection without performing a second user authentication.

15. The method as recited in claim 14, wherein the step of performing the second client authentication comprises the step of establishing the second connection between the client and the network access server when the client is allowed to connect to the server.

16. The method recited in claim 15, wherein the step of establishing the second connection comprises the step of establishing a second Point-to-Point (PPP) connection between the client and the network access server.

17. The method recited in claim 15, wherein the step of establishing the second connection comprises the step of establishing a second Serial Line Internet Protocol (SLIP) connection between the client and the network access server.

18. The method recited in claim 15, wherein the step of establishing the second connection comprises the steps of:
- generating a bundle header at the network access server;
- attaching the first connection and the second connection to the bundle header.

19. A method for establishing multiple connections between a client and a server, the method comprising the steps of:
- receiving a request to establish a first connection between the client and the server;
- performing a first client authentication phase, wherein the first client authentication phase determines whether the client is allowed to connect to the server;
- performing a client authorization phase, wherein the client authorization phase assigns a set of client access privileges to the first connection;
- performing a user authentication phase, wherein the user authentication phase determines whether the user is allowed to access the server;
- performing a user authorization phase, wherein the user authorization phase assigns a set of user access privileges to the first connection;
- receiving a request to establish a second connection between the client and the server;
- performing a second client authentication phase, wherein the second client authentication phase determines whether the client is allowed to connect to the server; and
- assigning the set of user access privileges to the second connection.

20. A computer-readable medium carrying one or more sequences of instructions for authenticating connections to a network access server, wherein execution of the one or more sequences of instructions by one or more processors causes the one or more processors to perform the steps of:
- receiving a request to establish a connection between the client and the server;
- performing a client authentication phase, wherein the client authentication phase determines whether the client is allowed to connect to the server;
- performing a client authorization phase, wherein the client authorization phase assigns a set of client access privileges to the connection;
- performing a user authentication phase, wherein the user authentication phase determines whether the user is allowed to access the server; and
- performing a user authorization phase, wherein the user authorization phase assigns a set of user access privileges to the connection.

21. A computer data signal embodied in a carrier wave, the computer data signal carrying one or more sequences of instructions for authenticating connections to a network access server, wherein execution of the one or more sequences of instructions by one or more processors causes the one or more processors to perform the steps of:
- receiving a request to establish a connection between the client and the server;
- performing a client authentication phase, wherein the client authentication phase determines whether the client is allowed to connect to the server;
- performing a client authorization phase, wherein the client authorization phase assigns a set of client access privileges to the connection;
- performing a user authentication phase, wherein the user authentication phase determines whether the user is allowed to access the server; and
- performing a user authorization phase, wherein the user authorization phase assigns a set of user access privileges to the connection.

22. A computer apparatus comprising:
- a processor; and
- a memory coupled to the processor, the memory containing one or more sequences of instructions for authenticating connections to a network access server, wherein execution of the one or more sequences of instructions by the processor causes the processor to perform the steps of:
  - receiving a request to establish a connection between the client and the server;
  - performing a client authentication phase, wherein the client authentication phase determines whether the client is allowed to connect to the server;
  - performing a client authorization phase, wherein the client authorization phase assigns a set of client access privileges to the connection;
  - performing a user authentication phase, wherein the user authentication phase determines whether the user is allowed to access the server; and
  - performing a user authorization phase, wherein the user authorization phase assigns a set of user access privileges to the connection.

* * * * *